United States Patent [19]
Yasuda et al.

[11] Patent Number: 5,628,222
[45] Date of Patent: May 13, 1997

[54] METHOD OF MANUFACTURING A RACK

[75] Inventors: Tsutomu Yasuda; Jun Minamoto, both of Saitama, Japan

[73] Assignee: Showa Corporation, Gyoda, Japan

[21] Appl. No.: 560,445

[22] Filed: Nov. 17, 1995

[30] Foreign Application Priority Data

Nov. 30, 1994 [JP] Japan ................................ 6-319402

[51] Int. Cl.$^6$ ........................... B21B 21/00; B21B 17/02
[52] U.S. Cl. ................................................ 72/192; 72/370
[58] Field of Search ........................... 72/192, 193, 208, 72/220, 370, 398

[56] References Cited

U.S. PATENT DOCUMENTS

| | | | |
|---|---|---|---|
| 2,771,117 | 11/1956 | Le Febvre et al. ................ | 72/80 |
| 3,756,057 | 9/1973 | Brooks, Jr. et al. ................ | 72/192 |
| 4,513,601 | 4/1985 | Herbulot ................ | 72/398 |
| 4,622,840 | 11/1986 | Diffenderfer et al. ................ | 72/370 |

*Primary Examiner*—Lowell A. Larson
*Assistant Examiner*—Rodney A. Butler
*Attorney, Agent, or Firm*—Dvorak and Traub

[57] ABSTRACT

A method of forming a hollow pipe-like rack material with rack teeth by causing mutual movement of the rack material and a forming roll is disclosed. A core bar is inserted inside the pipe-like material where the sectional profile of the core bar has a material support surface that is spaced apart from rack teeth formation portion of the rack material; the material support surface being raised.

3 Claims, 5 Drawing Sheets

METHOD OF MANUFACTURING A RACK

BACKGROUND OF THE INVENTION

1. Field of the Invention

The present invention relates to a method of manufacturing an automobile steering rack by rolling a side surface of a hollow pipe-like rack material with rack teeth.

2. Description of the Prior Art

A usual rack used for an automotive steering mechanism or the like is manufactured from a round bar by flattening a portion of the outer periphery of the bar and then forming rack teeth on the flattened portion. As the preferred rack material, a hollow pipe is used in order to satisfy a light weight demand.

Japanese Patent Publication (JP-B2) No. Sho 58-31257/1983 shows a method of forming rack teeth by plastically processing a rack material. In this method, a rack teeth formation portion of the material is pressed in a direction perpendicular to the axis of the material with an upper die having a tooth form which is complementary to the rack teeth.

Japanese Patent Publication (JP-B2) No. Hei 3-5892/1991 shows a method of forming a train of teeth on a flat portion of a hollow pipe-like rack material, by applying a forming die which has the same concavity and convexity as the rack teeth on the flat portion and then pressure fitting a punch into the hollow on the pipe. The flat portion of the material is forced into the concavity and convexity of the forming die.

However, both of these prior art techniques involve the preliminary step of forming a side portion of the hollow pipe with a flat surface. In addition, the forming process requires a high processing force (i.e., a high pressing force), wherein burrs are readily formed around the newly formed rack teeth.

Accordingly, the applicant has earlier proposed in Japanese Patent Application No. Hei 5-299091/1993 a method of rack manufacture that forms rack teeth with a comparatively low force, and in which less burrs are generated. In this technique, when manufacturing a rack with rack teeth formed in a side surface, a hollow pipe-like rack material is held with a core bar inserted in it, a forming roll with a rack teeth form forming on the outer periphery is held for rolling over the rack material, and mutual moving of the rack material and the forming roll is caused in the tangential direction of the forming roll, thus forming the rack material with the rack teeth.

In other words, in the above prior art technique (Japanese Patent Application No. Hei 5-299091/1993), when processing the hollow pipe-like rack material, a core bar is inserted in the pipe-like rack material in order to suppress unwanted deformation of the outer periphery of the material and to effectively flatten a portion of the outer periphery of the material in order to form the rack teeth on the flattened portion.

When the core bar is inserted in the rack material, as shown in FIGS. 7A and 7B, a sectional profile will be formed which follows the sectional profile the rack teeth formation portion of the product rack. The sectional profile has a material support surface which is spaced from the rack teeth formation portion of the rack material, the material support surface being an entirely flat surface. Referring to FIGS. 7A and 7B a problem solved by the invention will be described, where designated at 1 is the rack material, at 1A the rack teeth, at 2 the core bar, and at 2A the material support surface.

FIGS. 7A and 7B show a process of forming a hollow pipe-like rack material with rack teeth of rack by making use of the shape of core bar in the prior art technique noted above, FIGS. 7A and 7B showing an initial stage and a final stage, respectively, of the process.

The side surface of the rack material that is pushed by the addendum of the forming roll, is partly deviated toward the clearance with the core bar and also partly deviated toward the outer periphery of the material, and the remainder being deviated the bottom of teeth form of the forming roll.

In the initial stage of the process, deviation (a) towards the clearance, readily proceeds, and eventually the deformation is suppressed by the material support surface 2A of the core bar (FIG. 7A). In this stage, the deformation is retarded at each end of the core bar. Consequently, a clearance 3 is produced between the material and core bar, and deformation toward the bottom of the teeth form of the forming roll (rack teeth 1A) is insufficient. Further, a depression 4 is formed in the center of the addendum of the rack teeth.

By increasing the forming cycles for raising the rack teeth to a predetermined height, the deviation proceeds in the direction of reducing the clearance 3. Since at this time the material support surface of the core bar is an entirely flat surface, the distance between the point of action of force on the addendum of the teeth form of the forming roll and each core bar end is small, and considerable forming cycles are required until the final shape (FIG. 7B) is obtained. At the same time, deviation (a) toward the outer periphery of the material is increased, and a great force acts against the clamp force on the material outer periphery. The deviation toward the outer periphery of the material is cut off when polishing the outer periphery of the material to a true circle after the rack forming process, thus resulting in waste of material.

SUMMARY OF THE INVENTION

An object of the invention is to provide a method of rack manufacture, which can overcome the drawbacks inherent in the prior art techniques, as described above. It is another object to provide a method of manufacture wherein a rack can be made with comparatively low forming forces, and with generation of less burrs, without reducing the processing efficiency, i.e., without increasing the forming cycles of the material.

According to the present invention, there is provided a method of manufacturing a rack with rack teeth formed along a side surface of a pipe, which comprises the steps of holding a hollow pipe-like rack material which has a core bar inserted therein, holding a forming roll with a peripheral rack teeth form for rolling over the rack material, and causing mutual rolling of the rack material and the forming roll in the tangential direction of the forming roll, and in which the sectional profile of the core bar has a material support surface spaced apart from rack teeth formation portion of the rack material, the material support surface being a raised surface.

The raised material support surface of the core bar can also be formed by a central flat surface and opposite side taper surfaces.

According to the invention, rack teeth can be formed in a rack material by causing mutual moving of the rack material and forming roll in the tangential direction of the orientation of the forming roll. When the forming roll is pressed against the rack material and the rack material is caused to move over the forming roll in the tangential direction thereof, the forming roll is rotated by the tangential forces that are present while wedging the rack material against the rack teeth form in the forming roll.

The inter-axis distance between the forming roll and rack material can be reduced for every predetermined number of cycles (for instance every cycle) of movement between the forming roll and rack material. Thus, the forming roll wedges incrementally into the material during each cycle of movement, making it possible to form rack teeth without requiring high forces at each cycle, but rather, comparatively low forces can be used. Further, the rack teeth thus formed are free from burrs, and which exhibit excellent mechanical strength.

Further, the cross sectional profile of the core bar has a material support surface which is spaced from the rack teeth formation portion of the rack material and is raised (see FIGS. 6A and 6B). Thus, assuming the material support surface to be of the same height as in the prior art, the thickness deviation towards the clearance with the core bar readily proceeds, so that the deformation of the material at the center of the material support surface is restricted sooner (FIG. 6A). Thus, the raising of the rack teeth of the material is likewise brought about sooner, making it possible to form rack teeth with increased processing efficiency.

Furthermore, since the material support surface of the core bar is raised, less thickness deviation towards the outer periphery of material takes place in the final stage of the forming process (FIG. 6B), and the yield of material is correspondingly increased. Moreover, since the force applied against the clamp force on the material outer periphery is small, it is possible to form a rack having a high degree of true circularness.

BRIEF DESCRIPTION OF THE DRAWINGS

The present invention will be understood more fully from the detailed description given herein below and from the accompanying drawings of the preferred embodiments of the invention, wherein.

DESCRIPTION OF THE PREFERRED EMBODIMENT

Figure 5:
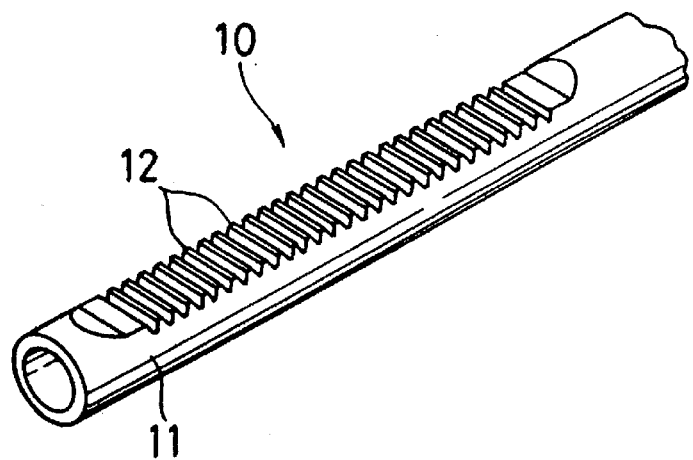
FIG. 5 is a perspective view showing a rack.

According to the invention, a rack 10, as shown in FIG. 5, is obtained from a hollow pipe-like rack material 11, having a number of rack teeth 12 formed across the axial direction of a flat surface on the outer periphery of the material 11.

The rack 10 is manufactured by a rack manufacturing apparatus 20 as shown in FIGS. 1 to 4. The apparatus 20 as shown, comprises a bed 21, a material clamp 22, a core bar setter 23, a forming roll driver 24, and a tooth depth controller 25. In this apparatus, when the core bar 26 is inserted in the rack material 11, the rack material 11 and the forming roll 27 are caused to undergo mutual moving in the tangential direction of the forming roll 27, thus forming the rack material 11 with rack teeth 12.

The structure of various parts of the rack manufacturing apparatus 20 will now be described.

Figure 1:
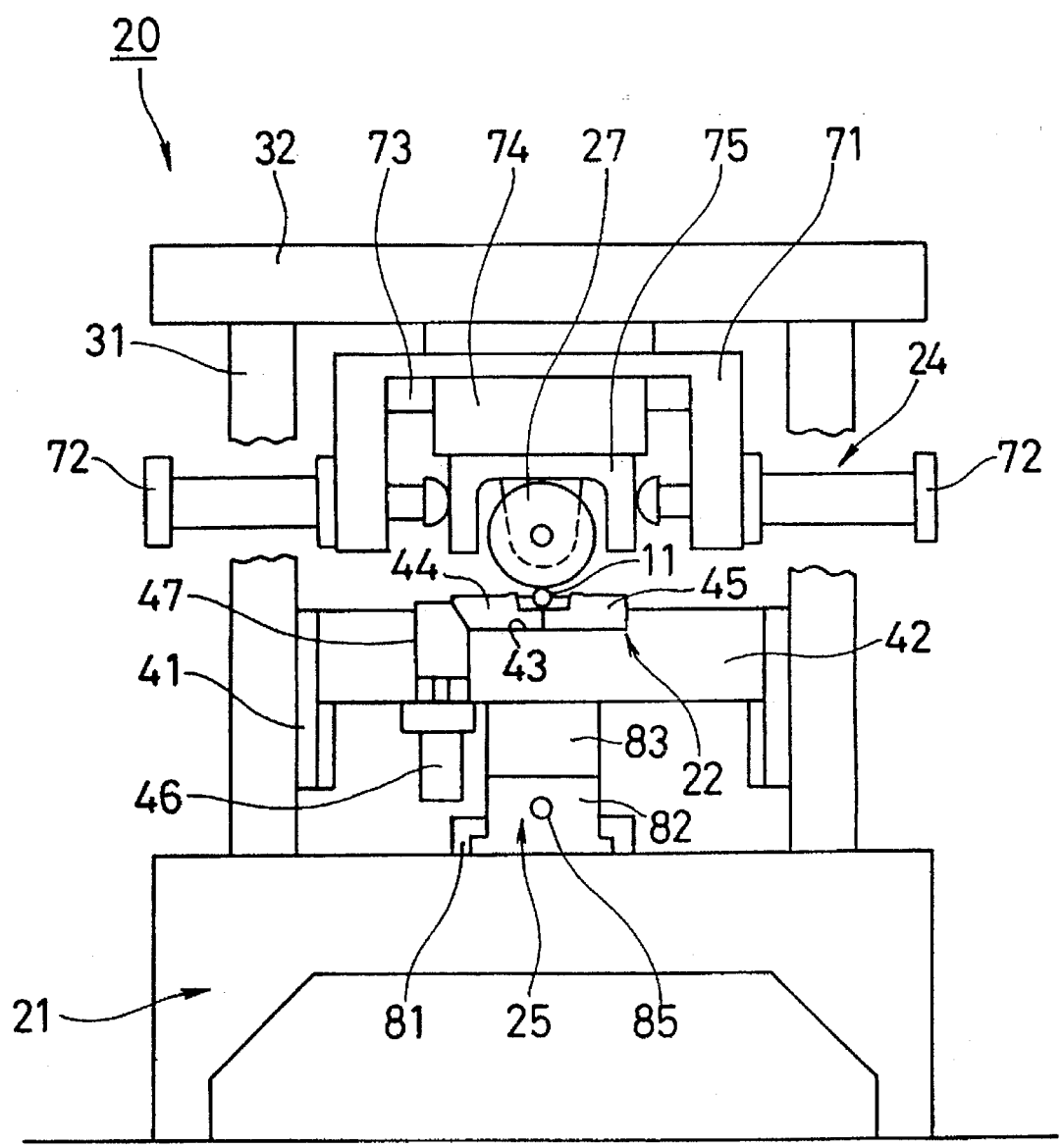
FIG. 1 is a front view showing a rack manufacturing apparatus used for carrying out an embodiment of the method according to the invention.
Figure 2:
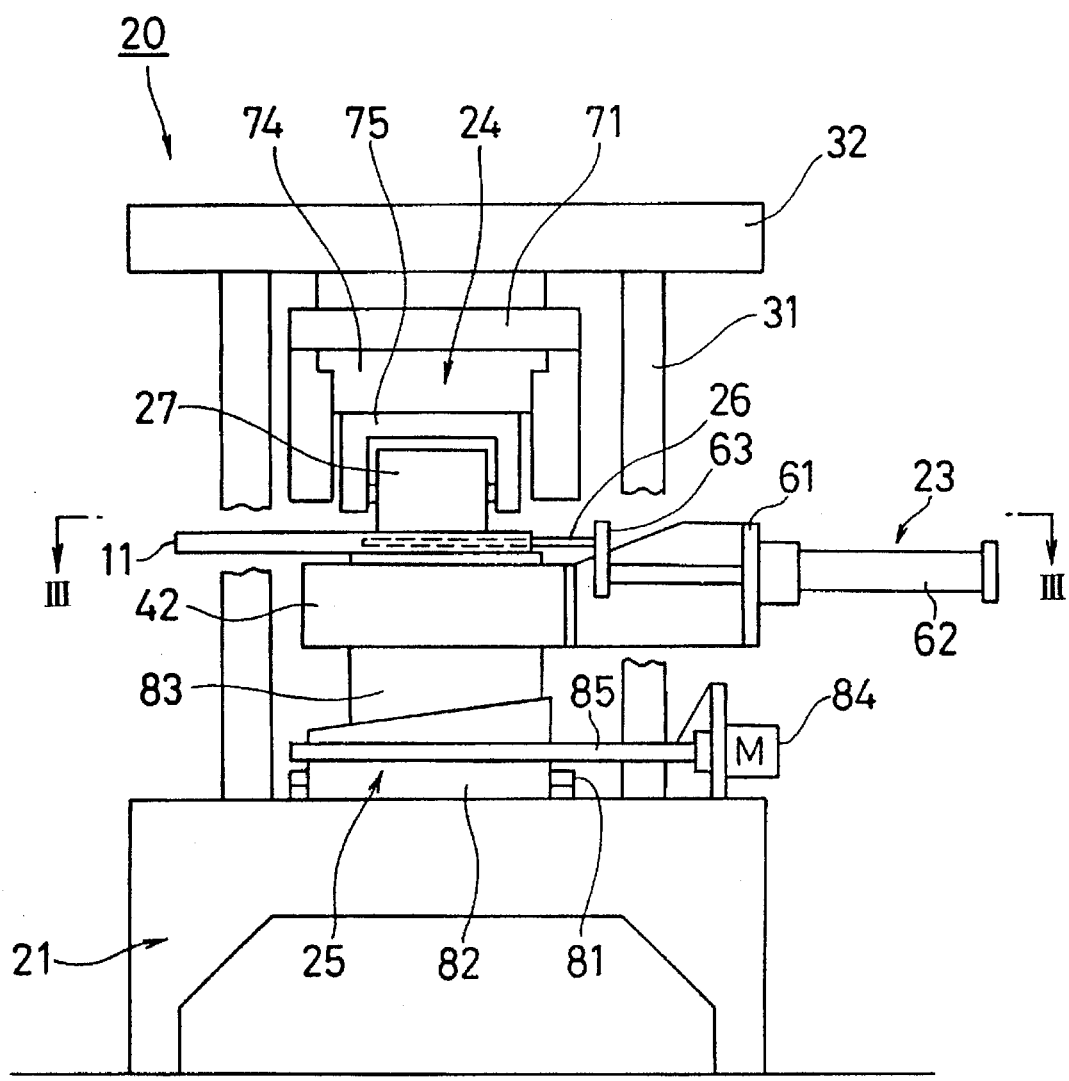
FIG. 2 is a side view showing the same apparatus.

(A) Bed 21 (FIGS. 1 and 2)

The bed 21 supports a ceiling 32 via four corner posts 31.

(B) Material clamp 22 (FIGS. 1 to 4)

The material clamp 22 has a clamp holder 42 which can be guided along a camp holder guide 41 secured to the posts 31. The clamp holder 42 has a recess 43, in which a pair of, i.e., left and right, clamp members 44 and 45 are disposed for supporting the rack material 11 therebetween.

The clamp members 44 and 45 are movable to the left and right in the recess 43 of the clamp holder 42. A clamp cylinder 46 is provided such that it is integral with the underside of the clamp holder 42. A clamp cam 47 which is coupled to the rod of the clamp cylinder 46, has a wedge-like cam face abutting a side engagement on cam surface of the left clamp member 44.

Thus, when the clamp cam 47 is moved upward by the clamp cylinder 46, the left clamp 44 is moved to the right. As a result, the rack material 11 is held between the left and right clamp members 44 and 45 to be ready for the rack forming process on the rack material 11. When the rack forming process on the rack material 11 is over, the clamp cam 47 is lowered by the clamp cylinder 46. As a result, the left clamp member 44 is returned to the initial position by a spring (not shown) which is provided between the two clamp members 44 and 45, whereby the holding of the rack material 11 between the two clamp members 44 and 45 is released.

Figure 3A:
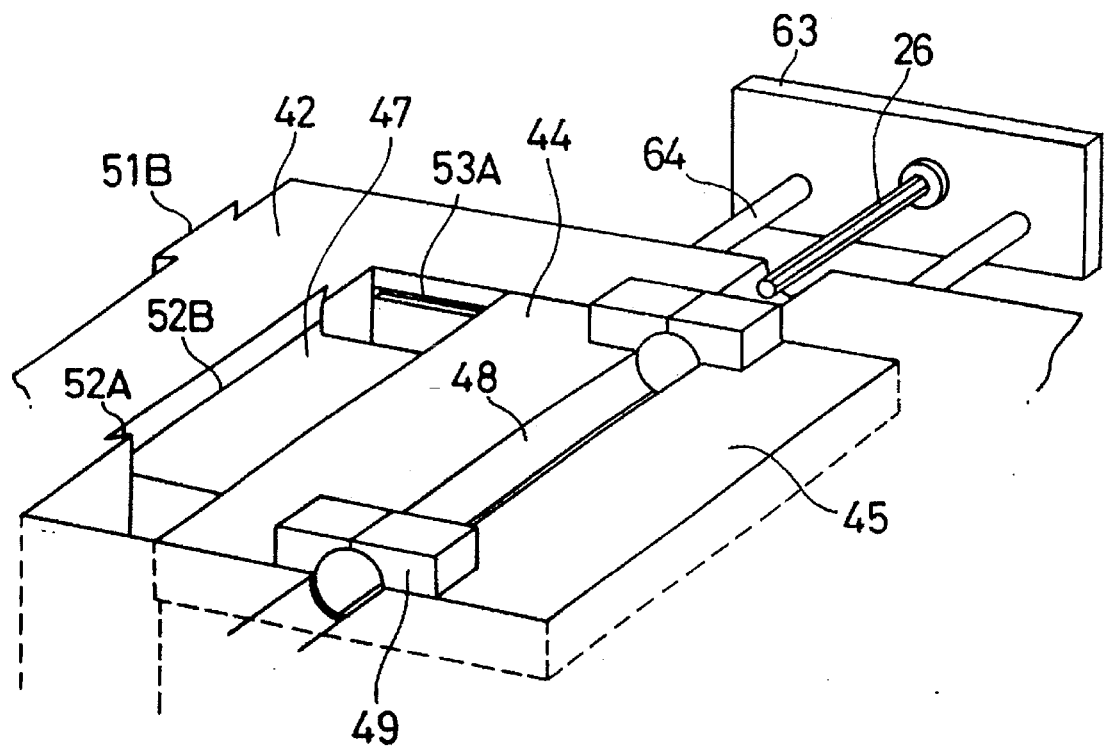
FIG. 3A is a detailed fragmentary perspective view taken along line III—III of FIG. 2.
Figure 3B:
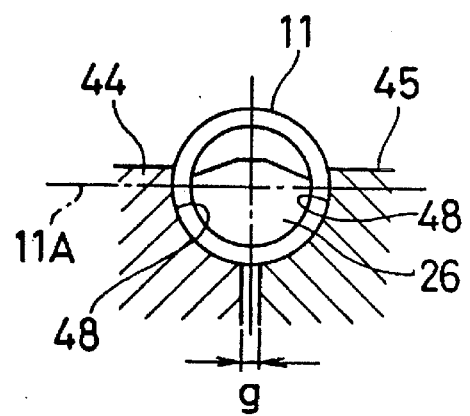
FIG. 3B is an enlarged-scale sectional view showing a rack material and a core bar set in clamp members.
Figure 4:
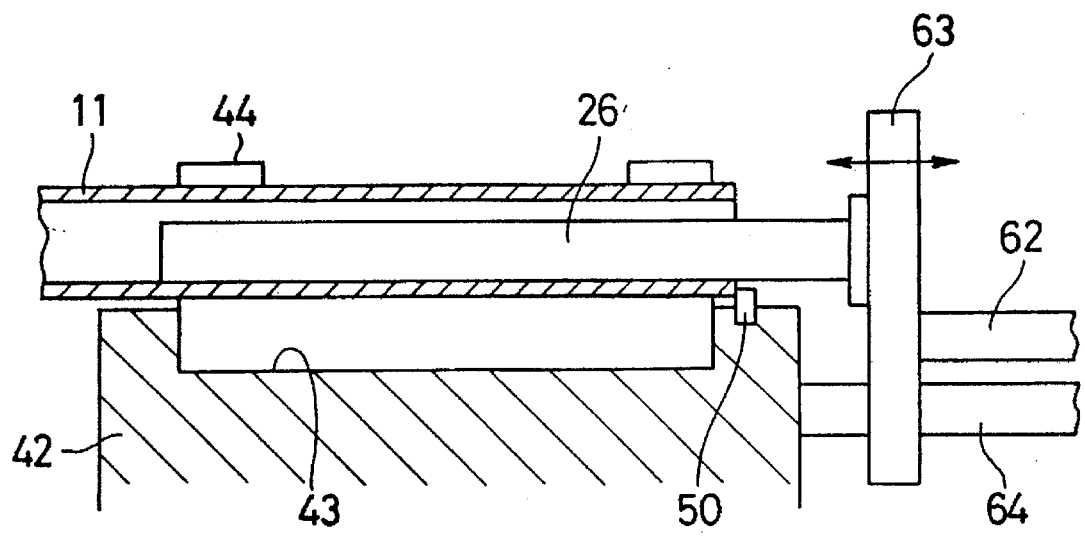
FIG. 4 is a sectional view showing a state of insertion of the core bar in the rack material.

The two clamp members 44 and 45, as shown in FIGS. 3A, 3B and 4, each have a lower surface clamp part 48 and an upper surface clamp part 49. The lower surface clamp parts 48 are provided over the entire length of the clamp members 44 and 45, and their clamp surfaces have substantially a complementary shape to the outer periphery of the pipe-like rack material 11 so that they can clamp the lower half and a portion above the equator line 11A of the rack material 11. The upper surface clamp parts 49 are provided at a front and a rear end portion of the clamp members 44 and 45 to ensure reliable holding of the rack material 11. Their clamp surface have a substantially complementary shape to the outer periphery of the pipe-like rack material 11 so that they can clamp the upper half of the rack material. The lower and upper clamp parts 48 and 49 of the left clamp member 44 and those of the right clamp member 45 can hold the rack material 11 clamped by leaving a slight clearance g (see FIG. 3B) between them.

Reference numeral 50 in FIG. 4 designates a stopper for positioning the rack material 11 held between the two clamp members 44 and 45 in a holding position in the longitudinal direction.

The camp holder guide 41 and clamp holder 42, the clamp cam 47 and clamp holder 42, and the left clamp member 44 and clamp holder 42, are coupled to one another by engagement between grooves 51A (not shown), 52A, 53A and projections 51B, 52B, 53B (not shown), respectively, so that they can be guided for movement in one direction only.

(C) Core member setter 23 (FIGS. 1 to 4)

The core bar setter 23 has a cylinder bracket 61 provided on the rear surface of the clamp holder 42 and a core bar cylinder 62 mounted on the cylinder bracket 61. A core bar mounting bracket 63 is secured to the rod of the core bar cylinder 62, and the core bar 26 noted above is mounted on the core bar bracket 63. Bracket guides 64 are provided between the cylinder bracket 61 and clamp holder 42 for guiding the core bar mounting bracket 63.

Thus, when the core bar mounting bracket 63 is advanced by the core bar cylinder 62, the core bar 26 is set in its material insertion position between the left and right clamp members 44 and 45, thus permitting insertion of the core member 26 into the rack material 11 to be ready for the rack forming process on the rack material 11. When the rack forming process on the rack material 11 is over, the core bar mounting bracket 63 is retreated by the core bar cylinder 62. As a result, the core bar 26 is taken out from the pipe-like rack material 11.

In this embodiment, the core bar is set in a predetermined position for each process. However, it is also possible to have the core bar continuously secured in a predetermined position.

(D) Forming roll drive (FIGS. 1 and 2)

The forming roll drive 24 has a pair of, i.e., left and right, roll reciprocating cylinders 72, 72 provided on opposite sides of a cylinder bracket 71 depending from the ceiling 32. The cylinder bracket 71 has an underside side guide 73, along which a slide bracket 74 is guided for movement in transversal directions. The slide bracket 74 supports a roll holder 75, in which the forming roll 27 noted above is supported rotatably.

Thus, the forming roll 27, with its peripheral rack teeth form, is held for rolling over the rack material 11 held between the two clamp members 44 and 45 of the material clamp 22. The forming roll 27 is caused to undergo moving relative to the rack material 11 in its tangential direction with transversal reciprocation of the slide bracket 74 caused by the operation of the left and right roll reciprocating cylinders 72.

In this embodiment, the cylinder bracket is secured to the ceiling. However, it is also possible to have the cylinder bracket supported in the ceiling for rotation about its axis. With this arrangement, it is possible to form a helical rack with teeth inclined with respect to the rack axis.

(E) Tooth depth controller 25 (FIGS. 1 and 2)

The tooth depth controller 25 has a tooth depth control cam 82, which is guided for back-and-forth movement by a cam guide 81 provided on top of the bed 21. A driven section 83 which is provided on the underside of the clamp holder 42 has a lower engagement on cam surface abutting a wedge-like cam face of the tooth depth control cam 82. A threaded shaft 85 driven by a motor 84 supported on the bed 21, is meshed with the tooth depth control cam 82.

In the tooth depth controller 25, for every reciprocation cycle of the forming roll 27 caused by the forming roll drive 24, the threaded shaft 85 is rotated by a predetermined angle to cause a constant extent advancement of the depth control cam 82 along the cam guide 81. With every advancement of the depth control cam 82, the clamp holder 42 is raised along the clamp holder guide 41. The clamp holder 42 is raised in synchronism with the reciprocation of the forming roll 27, and for every frictional movement cycle of the forming roll 27 with respect to the rack material 11, the inter-axis distance between the rack material 11 and forming roll 27 is reduced to gradually increase the depth of the rack teeth.

Figure 6A:
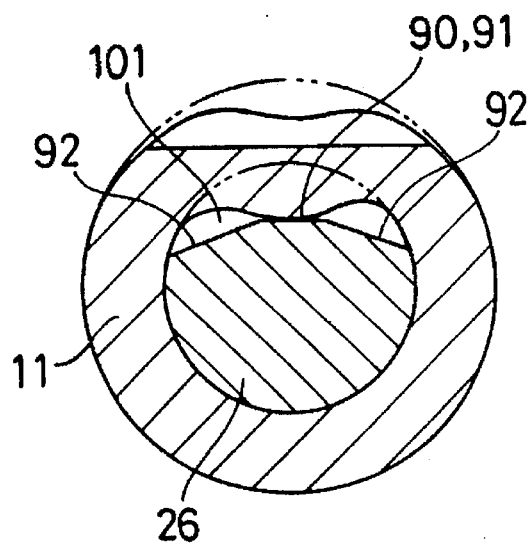
FIGS. 6A and 6B are schematic sectional views illustrating a rack teeth cutting process on a rack material according to the invention.
Figure 6B:
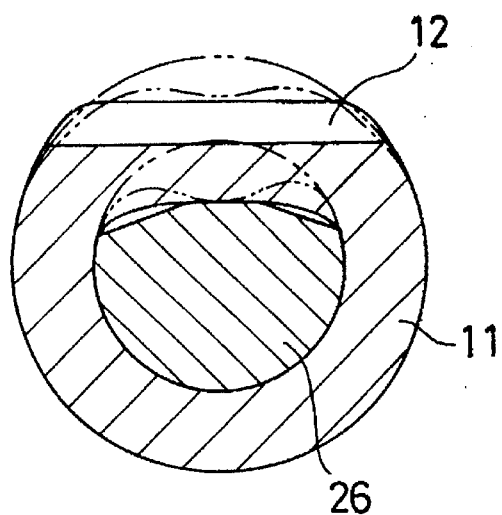
Figure 7A:
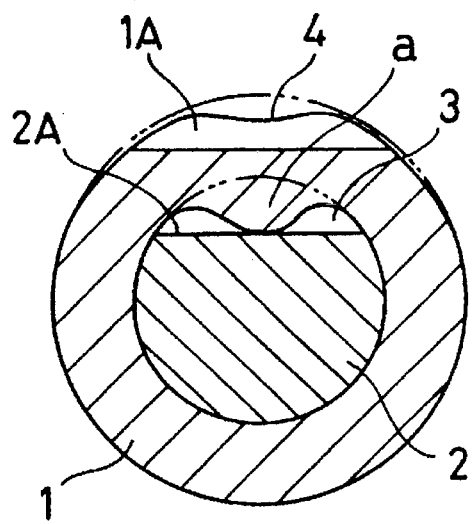
FIGS. 7A and 7B are schematic sectional views illustrating a rack teeth cutting process on a rack material in the prior art.
Figure 7B:
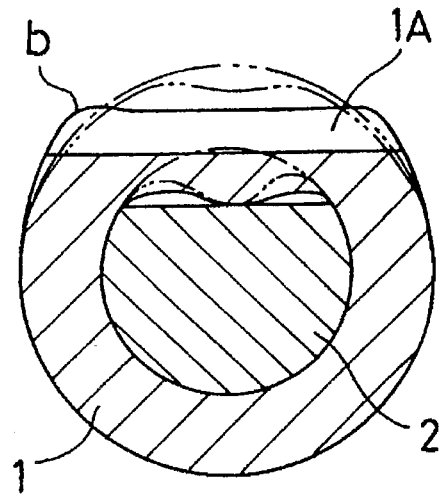

The core bar 26 used in the rack manufacturing apparatus 20 has a sectional profile as shown in FIGS. 6A and 6B. As shown, the core bar 26 has a material support surface 90 which is spaced apart from a rack teeth formation portion of the rack material 11, the material support surface 90 being raised in shape. The raised shape of the material support surface 90 is suitably formed by a central flat surface 91 and opposite side taper surfaces 92, 92.

With the rack manufacturing apparatus 20, the rack 10 is manufactured by the following procedure.

First, the core bar 26 is set in the material insertion position between the left and right clamp members 44 and 45 by operating the core bar setter 23.

Then, the rack material 11 is positioned in the material insertion position between the two clamp members 44 and 45, and then the core bar 26 is inserted into the rack material 11. At this time, the rack material 11 is positioned at its holding position in the longitudinal direction by bringing its end face into engagement with the stopper 50 provided on the clamp holder 42. Then, the rack material 11 is clamped between the two clamp members 44 and 45 by operating the clamp 22.

Then, the clamp holder 42 is set to a suitable raised position by operating the tooth depth controller 25. Then, reciprocation of the forming roll 27 is caused by operating the forming roll drive 24. The forming roll 27 is thus caused to move over the rack material 11 with the back or inner surface thereof supported by the material support surface 90 of the core bar 26 with its rack teeth form wedging into the outer periphery of the material 11. In this way, shallow rack teeth 12 are formed by cold working.

Subsequently, every time the rolling cycle of the forming roll 27 with respect to the rack material 11 in the step (4) is over, the inter-axis distance between the rack material 11 and forming roll 27 is reduced by upwardly shifting the clamp holder 42 with the tooth depth controller 25. In this way, the depth of the rack teeth 12 is gradually increased, thus eventually forming rack teeth 12 having a predetermined tooth depth.

After completion of the forming step (5), the core bar 26 is removed by operating the core bar setter 23, thus releasing the rack material 11 by the clamp members 44 and 45 of the clamp 22.

The embodiment as described above has the following advantageous effects.

First, the rack material 11 can be formed with rack teeth 12 by causing mutual moving of the rack material 11 and forming roll 27 in the tangential direction of the forming roll 27. While at this time the forming roll 27 is held in forced contact with the rack material 11, since the rack material 11 undergoes moving over the forming roll 27 in the tangential direction, the forming roll 27 is rotated by the tangential force while wedging into the rack material 11, thus forming the rack material 11 with the rack teeth 12.

The forming roll 27 can reduce the inter-axis distance with respect to the rack material 11 for every mutual moving cycle noted above with respect to the rack material 11. The forming roll 27 thus wedges into the material very little for every mutual moving cycle. Thus, it is possible to form the rack teeth 12 without requiring a high force at a time but with comparatively low force. Further, less burrs are formed around the rack teeth 12 thus formed, and it is possible to form rack teeth 12 having excellent mechanical strength by mutual rolling.

Secondly, the sectional profile of the core bar 26 which is inserted into the rack material 11 has the material support surface 90 spaced apart from the rack teeth formation portion of the rack material 11, the material support surface 90 being raised (FIG. 6A). Thus, the length of arc of the material inner periphery (upper side) between the opposite ends of the material support surface of the core bar 26 is increased. Meanwhile, the clearance between the outer clamped material surface and each end of the material support surface is increased. Thus, the force applied from the addendum side of the forming roll can more readily cause deviation of the material side surface toward the core bar, and the deformation of the material can be more quickly restricted by the flat surface 91 of the material support surface of the core bar. Thus, the rack teeth of material can be raised more quickly, and the processing efficiency can be increased.

Further, since the material support surface 90 of the core bar is raised, the moment of the force of the addendum of the forming roll acting on the ends of the material support surface can be increased. Thus, it is possible to efficiently fill the clearance 101 between the material and core bar in an initial stage of manufacture. In other words, in the final stage of process of manufacture less deviation of material toward the outer periphery thereof results, and thus the yield of material is correspondingly increased. Less deviation of material toward the outer periphery thereof means less force against the clamp force on the material outer periphery, and it is thus possible to form a rack having higher true circularness.

While a preferred embodiment has been described with reference to the drawings, the specific constitution of the embodiment is by no means limitative, and changes and modifications in the details of design may be made without departing from the scope of the invention. For example the raised material support surface may be entirely arcuate and have no central flat surface. As a further alternative, arcuate surfaces may be provided on the opposite sides of the central flat surface of the material support surface. As a still further alternative, it is possible to provide a material support surface having a central protuberance.

Further, according to the invention, it is necessary to cause relative movement of the rack material and forming roll. In the above embodiment, the forming roll is caused to undergo reciprocation by using the forming roll drive 24. Conversely, it is possible to cause reciprocation of the rack material.

As has been shown in the foregoing description, it is possible to provide a method of rack manufacture which permits formation of rack teeth with comparatively low forces and with less burr generation and, which makes the depth of the rack teeth uniform in the tooth width direction.

While the preferred embodiments of the invention have been described in detail with reference to the drawings, they are by no means limiting, and various changes and modifications are possible without departing from the scope and spirit of the invention which is set forth in the following claims.

What is claimed is:

1. A method of forming rack teeth by rolling a side surface of a rack material composed of a hollow pipe, comprising the steps of:

holding a hollow pipe-like rack material provided with a core bar inserted therein;

holding a forming roll having a peripheral rack teeth form rotatably along the rack material; and pushing out and forming the rack teeth on the side surface of the rack material by contacting the rack material and the forming roll with each other and by moving the rack material relative to the forming roll a plurality of times in a tangential direction of an orientation of the forming roll;

wherein a cross sectional profile of the core bar has a material support surface, said surface spaced apart from said rack teeth formation portion on the rack material in an initial stage of the rolling process, the material support surface being a raised surface.

2. The method of rack manufacture according to claim 1, wherein the raised material support surface is comprised of a central flat surface and opposing tapered side surfaces.

3. A method of forming rack teeth by rolling an outer peripheral side surface of a movable rack material composed of a hollow pipe, said side surface representing a rack teeth formation portion of said rack material, comprising the steps of:

holding a hollow pipe-like rack material provided with a core bar inserted therein;

holding a rotatable forming roll having a peripheral rack teeth form along the rack material; and pushing said form towards said outer peripheral side surface and forming the rack teeth on the outer peripheral side surface of the rack material, said rack teeth formed on said material by mutually moving the rack material and the forming roll into contact against each other along said formation portion a plurality of successive times, a revolution of said forming roll representing one movement of said roll along said formation portion, the rack being moved in a tangential direction of an orientation of the forming roll, with said rack teeth form being successively moved closer towards said rack material after each successive rotation of said forming roll, wherein a cross sectional profile of the core bar has a material support surface, said surface spaced apart from said rack teeth formation portion on the rack material in an initial stage of the rolling process, the material support surface being a raised surface.

* * * * *